United States Patent [19]
Kurei

[11] 3,932,878
[45] Jan. 13, 1976

[54] FILM WINDING AND SHUTTER RELEASE ERROR PREVENTION APPARATUS

[75] Inventor: Hiroshi Kurei, Kawagoe, Japan

[73] Assignee: Asahi Kogaku Kogyo Kabushiki Kaisha, Tokyo, Japan

[22] Filed: June 20, 1974

[21] Appl. No.: 481,463

[30] Foreign Application Priority Data
June 26, 1973  Japan............................ 48-75096[U]

[52] U.S. Cl................. 354/153; 354/204; 354/268
[51] Int. Cl.².................... G03B 19/12; G03B 17/38
[58] Field of Search ........... 354/153, 204, 206, 207, 354/268; 242/71.5

[56] References Cited
UNITED STATES PATENTS
3,447,440  6/1969  Ettischer............................ 354/153
3,774,514  11/1973  Okamoto et al................ 354/204 X Primary Examiner—Richard A. Wintercorn
Attorney, Agent, or Firm—Knobbe, Martens, Olson, Hubbard & Bear

[57] ABSTRACT

For use in a single lens reflex camera having a swingable mirror, a device for associating the film winding and shutter release in a manner free from error, characterized in that an arresting lever is so arranged that the book portion thereof is in association with the arresting portion of a cam plate associated with the film winding lever and the opposite end of the arresting lever is in opposition to one end of an intermediate art lever as well as to the tapered surface formed on one end of a member associated with the shutter button. The operation of the shutter is automatically prevented by the arresting lever until the film winding operation is completed. Likewise, the film winding operation is automatically prevented by the arresting lever until the shutter button operation is automatically prevented by the arresting lever until the shutter button operation is completed.

8 Claims, 4 Drawing Figures

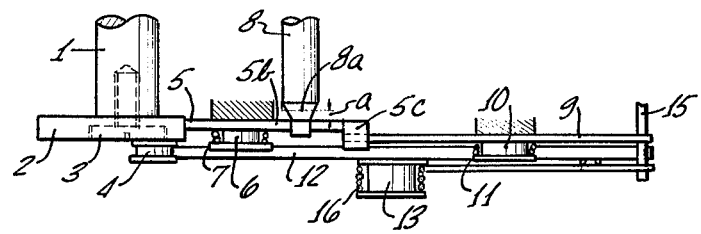

FILM WINDING AND SHUTTER RELEASE ERROR PREVENTION APPARATUS

BACKGROUND

This invention relates to the field of camera equipment and more particularly it is related to mechanisms used in conjunction with the film winding and shutter release operations in a single lens reflex camera with a swingable mirror. The invention is specifically directed to an apparatus to prevent or eliminate error related to the interface of the film winding and the shutter release operations.

In the prior art, with less sophisticated cameras, a problem exists in making sure that the shutter release button is not activated until the film has been advanced for the taking of the next picture. Otherwise, if the shutter release button is activated before the film is wound properly, the typical result is a double exposure ruining not only the previously taken picture, but also the picture just taken. This can be quite frustrating to the typical amateur photographer where it may be impossible to again recapture the same setting or subject matter which he had previously taken.

Another drawback to the prior art typical cameras is the inability of the normal photographer to remember whether he has advanced the film winding after taking the last picture. Consequently, in order to be on the safe side many times the photographer will advance the film again or a second time. This, of course, results in a waste of the film which will require the photographer to replace the film in the camera more frequently.

SUMMARY

The invention is useful for eliminating the error operations during photographing associated with the operation of the shutter button and the film winding mechanism in single lens reflex cameras with a swingable mirror. When the device is in the position to allow the film winding, the shutter button cannot be operated. However, where the shutter button is depressed for photometry, the film winding is prohibited. In the half-way position of film winding the device also does not allow the shutter button depressing operation.

At the time when the film has been wound, the next film winding operation is prevented until the next shutter button operation is completed. During operation of the shutter the next film winding operation cannot be effected even when the shutter button has been restored. The next film winding operation can be effected only after the shutter operation has been completed.

The device comprises an arresting lever which pivots alternately between engagement with a cam plate connected to the film winding mechanism and a rod connected to the shutter release button. The movement of the arresting lever is controlled by an intermediate lever which acts in response to the mirror lever and a spring.

This invention is designed to be of simple construction having a minimum number of components in order to be easily incorporated in cameras to eliminate the common operator errors associated with the shutter button and the film winding.

BRIEF DESCRIPTION OF THE DRAWINGS

FIG. 1 is a front elevational view of the mechanism according to this invention;

FIG. 2 is a bottom view of the mechanism shown in FIG. 1, the mechanism being shown in the position before film winding;

FIG. 3 is a similar view to FIG. 2 showing the mechanism in the position on the half-way of film winding; and FIG. 4 is a similar view to FIG. 2 showing the mechanism in the position after completing the film winding operation.

DETAILED DESCRIPTION OF THE INVENTION

The invention will be described hereinunder with reference to a preferred embodiment shown in the accompanying drawings. Referring to FIGS. 1 and 2, a cam plate or guide member 2 is fixedly attached by use of a screw 3 to the bottom end of a film take-up shaft 1 connected to a not shown film winding mechanism. The cam plate 2 includes an arresting portion 2a and a coaxially protruded circumferential portion 2b and also carries a pin 4 fixed to it. Pivoted on an axis 6 is an arresting lever or engaging means 5 urged clockwise (as viewed in FIG. 2) by means of a spring 7.

One end of the arresting lever 5 carries a hook portion 5a which is operative in association with the cam plate 2 while the other end of the arresting lever 5 includes a vertically bent portion 5c and an edge 5b arranged in opposition to a tapered surface 8a of an axially movable rod or adapter 8 associated with the shutter and shutter button which are not shown. An intermediate lever 9 is pivoted on an axis 10 and urged clockwise by use of a spring 11. One end of the intermediate lever 9 is engaged with the vertically bent portion 5c of the arresting lever 5.

Pivoted on an axis 13 is a mirror charge lever 12 having one end engaged with the pin 4 fixed to the cam plate 2 and the other end arranged in opposition to a mirror actuating lever 15 carrying a restoring spring 16.

Now the operation of the foregoing mechanism will be described. FIG. 2 illustrates the mechanism in the position before winding the film. In this position, since the spring force urging the intermediate lever 9 clockwise is selected to be larger than the spring force urging the arresting lever 5 clockwise, then the arresting lever 5 is in a stop position pressed against the shutter rod 8 by means of the intermediate lever 9 against the action of spring 7. Therefore, the hook portion 5a of the arresting lever 5 is retracted from the arresting portion 2a of the cam plate 2 thereby relieving the take-up shaft 1. Under these conditions if the shutter button is depressed for the purpose of light measurement, then the associated shutter rod 8 is depressed, thereby rotating the arresting lever clockwise by the tapered surface 8a formed on the shutter rod 8 to engage the hook portion 5a with the arresting portion 2a of the cam plate 2. Under these conditions the film winding operation is prevented and the vertically bent portion 5c of the arresting lever 5 forces the intermediate lever 9 to rotate counterclockwise against the action of spring 11 without giving any influence over the other mechanism (the position shown in FIG. 2 by two-dotted chain line).

FIG. 3 illustrates the mechanism in the half-way position of film winding, wherein the hook portion 5a of the arresting lever 5 is in opposition to the coaxially protruded circumferential portion 2b of the cam plate 2. Under these conditions the shutter button cannot be depressed, because when the tapered surface 8a thereof is engaged with the arresting lever 5 and the protruded circumferential portion 2b of the cam plate 2 prevents the arresting lever 5 from rotating clockwise by engaging with the hook portion 5a.

FIG. 4 illustrates by the solid lines the mechanism in the position after completing the film winding. The mirror charge lever 12 is rotated counter-clockwise by means of the pin 4 against the action of spring 14. At this time the mirror charge lever 12, against the action of restoring spring 16, moves the mirror actuating lever 15 to the shown position until it is arrested by a hook (not shown). Immediately before reaching its stop position, the mirror actuating lever 15 rotates the intermediate lever 9 counterclockwise against the action of spring 11, thereby relieving the arresting lever 5. In this position, however, the spring 7 cannot rotate the arresting lever 5 clockwise because of the engagement of the hook portion 5a with the protruded circumferential portion 2b. This prevents the shutter rod depressing movement. When the winding lever is restored from the winding operation completing position, the cam plate 2 is also restored by means of the take-up shaft 1 and simultaneously the mirror charge lever 12 is restored by the spring 14. With the restoration of the cam plate 2 the arresting portion 2a is engaged with the hook portion 5 a of the arresting lever 5, thereby prohibiting the next film winding and permitting the shutter release (the position shown in FIG. 4 by dotted line).

When the shutter is released for photographing, the mirror swings up, the front screen moves, and in response to a signal developed after exposure and immediately before completing the rear screen movement the mirror actuating lever 15 is released and restored by the restoring spring 16. Accordingly, the intermediate lever 9 rotates clockwise, thereby rotating the arresting lever 5 counter-clockwise by means of the vertically bent portion 5b. At this time the hook portion 5a of the arresting lever 5 retreats from the arresting portion 2a of the cam plate 2, thereby allowing the next winding operation.

As is appreciated from the foregoing detailed description, the present invention can satisfy, with a very simple construction, all the requirements stated in the beginning of this specification for associating the film winding operation with shutter release operation in a manner free from error. The mechanism of this invention ensures to prevent error operations, greatly improving the reliability of the photographing operations.

Although in the shown and described embodiment the shutter rod 8 is shaped to have a tapered surface 8a, it may also be shaped to have a stepped portion as shown in FIG. 1 by the dotted line. In this case when the mechanism is in the position before the film winding, the shutter rod may be displaced by a distance of a. This displacement may be used exclusively for operating the power switch for the purpose of photometry, while the further displacement of the shutter rod 8 may be used for locking and releasing the mirror-up lever (not shown). In the position on the half-way of film winding as shown in FIG. 3, the arresting lever 5 may be engaged into the stepped portion, so that the shutter rod 8 is displaceable only for a distance of a and is not operative to release any other members.

What is claimed is:

1. A combination film winding and shutter release error prevention device for use in a single lens reflex camera with a swingable mirror, said device comprising:
   a film winding mechanism;
   a shutter button;
   an arresting lever interconnecting said film winding mechanism with said shutter button;
   guide means connected to said film winding mechanism; and
   adapter means connected to said shutter button, said arresting lever pivotally mounted between said guide means and said adapter means, said arresting lever automatically preventing movement of said shutter button before said film winding operation is completed.

2. A combination film winding and shutter release error prevention device for use in a single lens reflex camera as defined in claim 1 wherein said arresting lever locks onto said guide means preventing movement of said film winding mechanism before the shutter button operation is completed.

3. A film winding and shutter interface device in combination with a single lens reflex camera with a swingable mirror comprising:
   a film winding mechanism mounted within said camera;
   a shutter release mounted within said camera;
   a cam plate connected to said film winding mechanism, said cam plate having an arresting portion and a protruding portion;
   an axially movable rod with a tapered portion responsively connected to said shutter release;
   an arresting lever pivotally mounted between said cam plate and said tapered rod, one end of said arresting lever locking onto said arresting portion of said cam plate when the operation of said film winding mechanism is completed and the other end of said arresting lever blocking movement of said axially movable rod as said rod is moved toward the shutter release position when said shutter operation is completed;
   an intermediate lever pivotally mounted adjacent said arresting lever, said intermediate lever moving said other end of said arresting lever in contact with said axially movable rod; and
   biasing means attached to said arresting lever, said biasing means moving said one end of said arresting lever into said locking position on said cam plate.

4. A film winding and shutter interface device in combination with a single lens reflex camera as defined in claim 3 and additionally comprising:
   a mirror charge lever pivotally mounted adjacent said cam plate; and
   a pin attached to said cam plate, a first end of said mirror charge lever in contact with said pin, the second end of said mirror charge lever moving said intermediate lever allowing said other end of said arresting lever to move away from said axially movable rod and allowing said biasing means to move said one end of said arresting lever into said locking position with said arresting portion of said cam plate to prevent further film winding prior to the shutter release operation.

5. An error free film winding and shutter release device for use in a single lens reflex camera having a swingable mirror, said device comprising:
   a film winding mechanism;
   a shutter button;
   a shutter rod having a tapered surface and responsively connected to said shutter button;

a cam plate mounted on said film winding mechanism and having an arresting portion and a protruding portion;

an arresting lever mounted on said camera with one end responsive to said arresting portion of said cam plate and the other end responsive to said tapered surface of said shutter rod;

an intermediate lever attached to said camera with a first end responsive to said other end of said arresting lever; and a mirror actuating lever attached to said camera for responsive contact with a second end of said intermediate lever, said one end of said arresting lever locking onto said arresting portion of said cam plate preventing operation of said film winding mechanism when said tapered surface of said shutter rod contacts said other end of said arresting lever by depressing said shutter button, said one end of said arresting lever contacting said protruding portion of said cam plate when said film winding mechanism is half way through its operation causing said other end of said arresting lever to block said shutter rod preventing depression of said shutter button, said second end of said intermediate lever being moved by said mirror actuating lever when said film winding mechanism operation is complete causing said one end of said arresting member to lock onto said arresting portion of said cam plate preventing operation of said film winding mechanism and allowing depression of said shutter button.

6. A film winding mechanism and shutter release button interface device for use with a single lens reflex camera, with a swingable mirror, said device comprising:

a guide means attached to said film winding mechanism;

adapter means connected to said shutter button, said guide means responsive to movement of said film winding mechanism, said adapter means responsive to movement of said shutter button;

an arresting lever pivotally mounted in said camera for alternately engaging said guide means and said adapter means, one end of said arresting lever for contacting said guide means and the other end of said arresting lever for contacting said adapter means;

a spring biased intermediate lever having a first end contacting said arresting lever for automatically urging said arresting lever away from said guide means; and means for automatically moving said urging means into and out of contact with said engaging means, said moving means moving said urging means into contact with said other end of said arresting lever to pivot said one end of said arresting lever out of contact with said guide means to allow operation of said film winding mechanism after operation of said shutter button has been completed, said other end of said arresting lever contacting said adapter means to prevent operation of said shutter button before said operation of said film winding mechanism is complete.

7. A film winding mechanism and shutter release button interface device for use with a single lens reflex camera as defined in claim 6 wherein said moving means comprises:

a mirror charge lever pivotally mounted within said camera, one end of said mirror charge lever responsively engaged with said guide means; and a mirror actuating lever having one end for contact with the other end of said mirror charge lever and for contact with said intermediate lever, movement of said guide means causing said other end of said mirror charge lever to pivot into contact with and move said one end of said mirror actuating lever to pivot said intermediate lever out of engagement with said other end of said arresting lever.

8. A film winding mechanism and shutter release button interface device for use with a single lens reflex camera, said device comprising:

a guide member attached to said film winding mechanism;

an adapter member connected to said shutter release button; and an arresting lever pivotally mounted in said camera for interconnecting said guide member and said adapter member, said arresting lever pivotal between two positions, said arresting lever locking onto said guide member in said first position preventing operation of said film winding mechanism, said arresting lever contacting said adapter means in said second position preventing operation of said shutter release button;

biasing means connected to said arresting lever to bias said arresting lever into contact with said guide member;

an intermediate lever pivotally mounted adjacent said arresting lever, one end of said intermediate lever contacting said arresting lever when said arresting lever is in said second position;

biasing means connected to said intermediate lever to bias said intermediate lever into contact with said arresting lever, said intermediate lever biasing means being stronger than said arresting lever biasing means, said arresting lever blocking movement of said adapter member preventing operation of said shutter button when said arresting lever is in said second position;

a mirror actuating lever mounted in said camera; and a mirror charging lever pivotally mounted between said guide member and said mirror actuating lever, said mirror charging lever responsive to movement of said guide member resulting in movement of said mirror actuating lever to move said intermediate lever out of contact with said arresting lever allowing said arresting lever biasing means to move said arresting lever into said first position.

* * * * *